V. HENRI, A. HELBRONNER & M. VON RECKLINGHAUSEN.
LIQUID STERILIZER.
APPLICATION FILED FEB. 26, 1910.
1,132,265.
Patented Mar. 16, 1915.
3 SHEETS—SHEET 1.
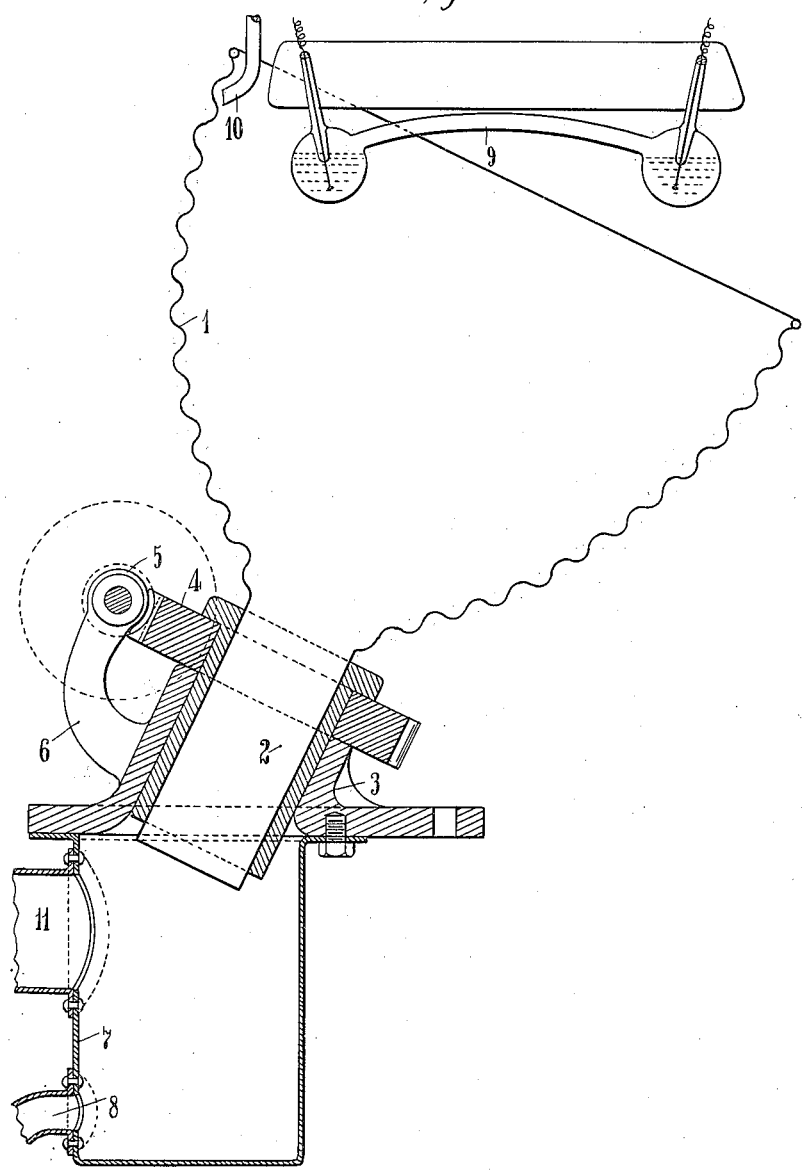

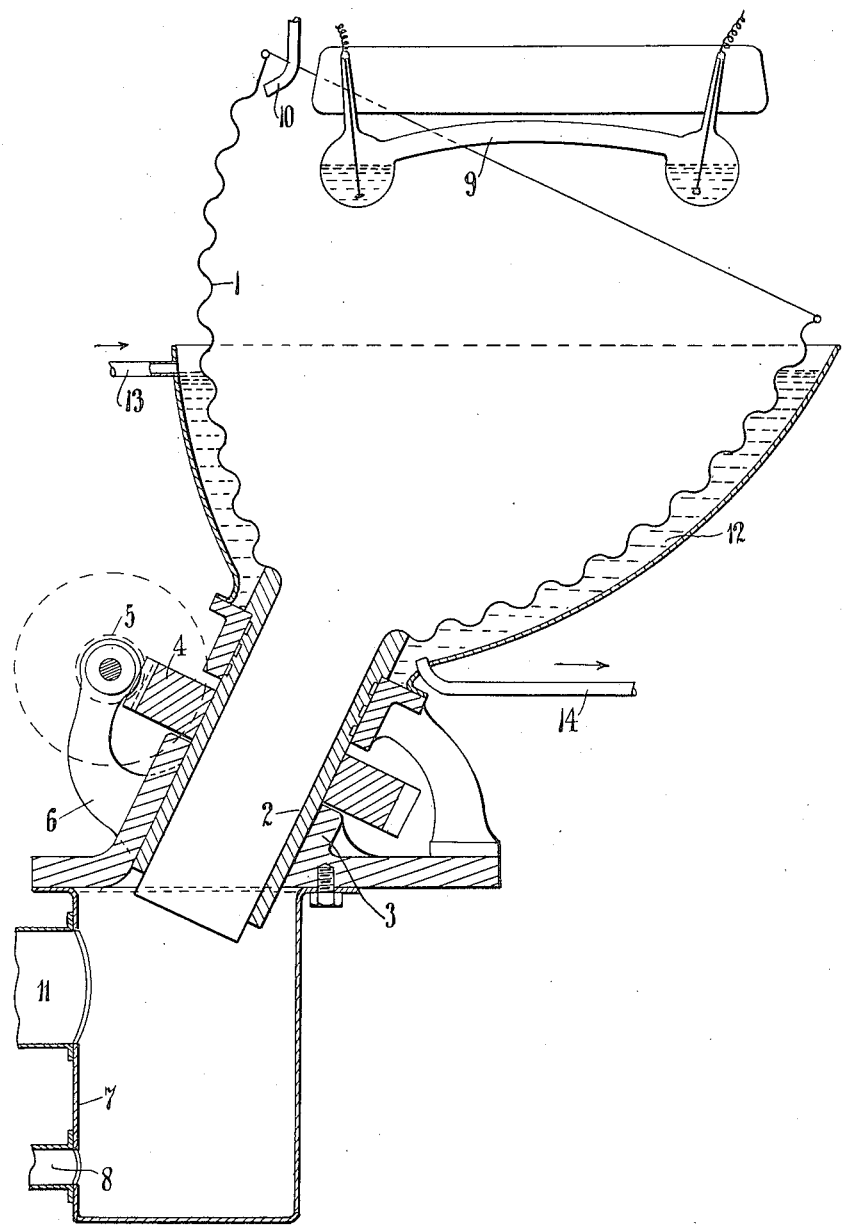

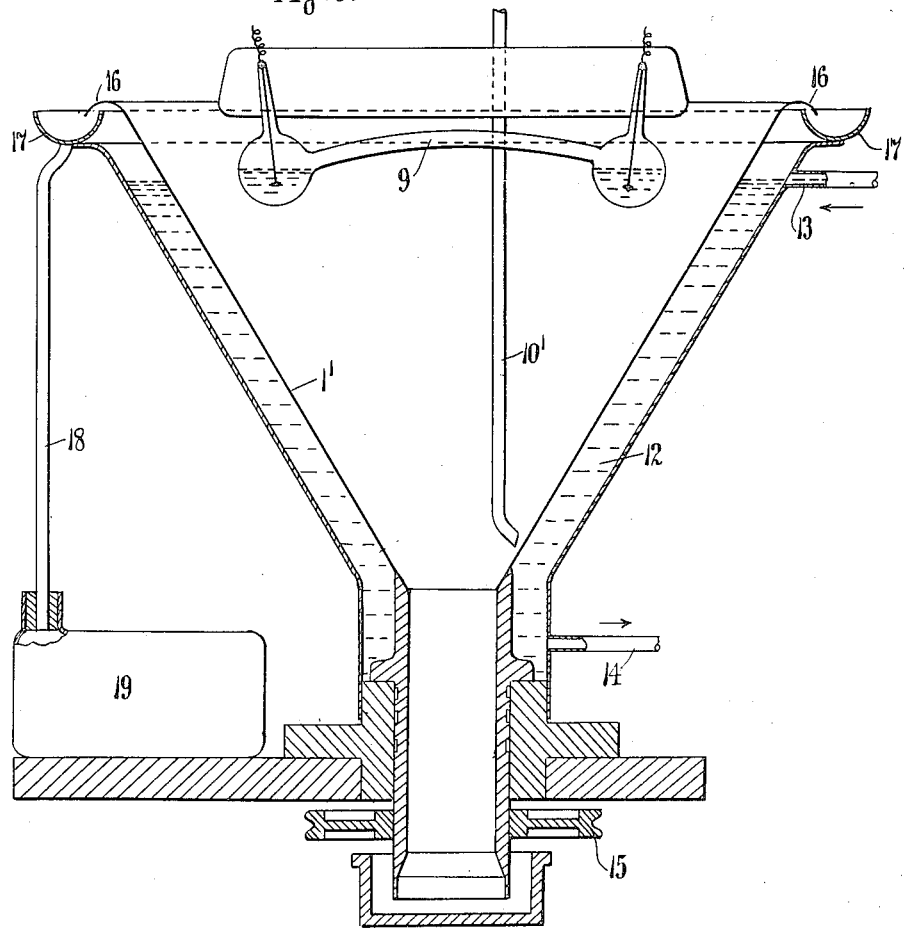

UNITED STATES PATENT OFFICE.

VICTOR HENRI, ANDRÉ HELBRONNER, AND MAX VON RECKLINGHAUSEN, OF PARIS, FRANCE, ASSIGNORS, BY MESNE ASSIGNMENTS, TO THE R. U. V. COMPANY, INC., A CORPORATION OF NEW YORK.

LIQUID-STERILIZER.

1,132,265.  Specification of Letters Patent.  Patented Mar. 16, 1915.

Application filed February 26, 1910.  Serial No. 546,252.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented new and useful Improvements in Liquid-Sterilizers, of which the following is a specification.

This invention relates to the sterilization of milk and other liquid foods, liquids used for medicinal and surgical purposes, serums and the like, and has for its object to provide an improved apparatus for attaining this end.

According to this invention we take advantage of the well-known bactericidal effect of ultra-violet rays by subjecting the liquid to be sterilized, preferably in a finely divided state, such as a spray or thin film, to ultra-violet rays from any suitable source. In order to insure that every particle of the liquid shall be subjected to the action of the rays, we prefer to keep it in motion so that a fresh surface shall be continually presented to them. The ultra-violet rays for use in our improved method of sterilization may be obtained in any convenient manner, but the source which we prefer to use is a mercury vapor electric lamp, the container of which is made of quartz or other material which permits the passage of the rays; such lamps can now be obtained commercially and are being used for various purposes.

The liquid to be sterilized may be contained in a shallow vessel above which a source of rays is located, and the surface of the liquid may be agitated by means of a current of air preferably sterilized, or some other inert gas. This current of air not only assists in bringing every particle of the liquid under the influence of the rays, but also prevents it from being contaminated by the presence of ozone which is formed when ultra-violet rays are passed through air. In the case of some liquids, such as milk for example, ozone imparts a very unpleasant taste, and it may have a deleterious effect on other liquids which it is desired to sterilize.

In order that our invention may be clearly understood, we will now proceed to describe by way of example some forms of apparatus by means of which it may be carried into practical effect.

In the accompanying drawings Figure 1 is a sectional view of one form of apparatus, and Figs. 2 and 3 are similar views illustrating modifications.

Referring now to Fig. 1, the apparatus comprises a funnel-shaped vessel 1, having corrugated walls, and supported rotatably at its lower end 2 in a fixed bearing 3, so that its axis is inclined to the perpendicular.

Secured on the lower end of the funnel is a gear wheel 4, which meshes with a worm 5 supported in a bracket 6, so that the funnel may be rotated.

The liquid to be sterilized is delivered near the top of the funnel in such a manner that it flows in a thin stream down the side of the funnel through the vent at the bottom into a container 7, from which it may be drawn off through a pipe 8.

The source of the ultra-violet rays is a mercury vapor lamp having a quartz container indicated at 9, which is supplied with current from any suitable source. The liquid to be sterilized is delivered to the side of the vessel 1 through a pipe 10, the supply being so adjusted with reference to the size of the vessel that it flows in a thin stream down the side.

It will be noted that the rays pass through the large opening in the bottom of the funnel into the container 7 so that there is no possibility of the liquid being reinfected on passing from the sterilizer to the container.

The rotation of the vessel on its axis by the medium of the gearing 5—4 causes the volume of liquid to be spread over the corrugated surface and a greater flow can thus be maintained, and the capacity of the apparatus is utilized to its greatest extent.

The corrugated surface of the funnel is an important feature of the apparatus. The centrifugal force due to the rotation of the apparatus causes the liquid to have greater depth in the grooves than on the raised portions of the funnel. The liquid passing through the funnel is therefore distributed alternately in deep and shallow layers, so that, as all the liquid must pass in a very thin film over the raised surfaces, every particle must come under the influence of the ultra-violet rays. In an apparatus without grooves the liquid would be of even thickness all through, and in the case of liquids which are not very translucent to the ultra-violet rays some particles of the liquid might not come under influence of the same.

In order to provide for passing a current of air over the surface of the liquid to be sterilized, we may use the pipe 11, the air, which is previously itself sterilized, being supplied by a suitable blowing apparatus, or as hereinbefore mentioned, an inert gas may be employed, and the funnel-shaped vessel filled with the same.

The current of air has a further useful effect in that it prevents the liquid from being unduly heated by the heat rays given out by the lamp.

In order to prevent heating of the liquid, we may provide the vessel 1 in which the liquid is sterilized with a cooling jacket. An arrangement for this purpose is illustrated in Fig. 2, in which an apparatus similar to Fig. 1 is shown having a jacket 12 to which cooling liquid, water for example, may be supplied by the pipe 13, the liquid flowing away from the jacket by the pipe 14.

By means of our improved apparatus, we are enabled to sterilize large quantities of liquid in a short time with an apparatus of comparatively small dimensions, the cost of sterilization being extremely low. Milk, which has been sterilized in this manner may be used for the preparation of sterilized butter and other sterilized milk products.

In place of using a funnel which is substantially parabolic in shape as indicated in the drawing, any suitable figure of rotation may be employed. For example, in Fig. 3 a conical funnel 1' is shown arranged to be rotated on a vertical axis through a grooved wheel 15. Furthermore, the apparatus is intended to be rotated at such a speed that the liquid to be sterilized will flow up the apparatus instead of down by centrifugal force, for which purpose the supply pipe 10' for the liquid has its outlet near the bottom of the funnel instead of at the top, and the funnel is provided with an overhanging lip 16 which delivers the liquid in an annular trough 17, from which it is conveyed by the pipe 18 to the receptacle 19 for sterilized liquid.

It is obvious that the apparatus shown in the drawing is only illustrative and suitable modifications depending upon the nature of the liquid which is to be sterilized may be adopted without departing from the scope of the invention.

We claim as our invention:—

1. Apparatus for sterilizing liquids by means of ultra-violet rays comprising a rotatable funnel having a corrugated surface along the inner surface of which the liquid is caused to flow in a thin film and a source of ultra violet rays suitably located with reference to said funnel so that every particle of the liquid is exposed to the action of the rays substantially as described.

2. In apparatus for sterilizing liquid, the combination of a corrugated moving surface, means for supplying liquid to said surface, and a source of ultra-violet rays to which said surface is exposed.

3. In apparatus for sterilizing liquid, the combination of a moving surface, means for supplying liquid to said surface in the form of a thin film, means for causing the film to assume different thicknesses at different parts of the surface, and a source of ultra-violet rays to which said surface is exposed.

4. In apparatus for sterilizing liquid, the combination of a moving surface, means for supplying liquid to said surface in the form of thin film of varying thickness, and a mercury vapor lamp to the radiations from which said film is exposed.

5. In apparatus for sterilizing liquid, the combination of a corrugated hollow body, means for rotating the same, a pipe for supplying liquid to be sterilized to the surface of said hollow body, means for collecting the liquid, and a source of ultra-violet rays to which the liquid on the surface of the hollow body is exposed.

6. In apparatus for sterilizing liquid, the combination of a hollow body shaped to a figure of revolution, said hollow body being provided with corrugations in planes substantially perpendicular to the axis of rotation, means for supplying liquid to the surface of said hollow body, and a source of ultra-violet rays to which said surface is exposed.

7. In apparatus for sterilizing liquid, the combination of a hollow body, means for rotating the same, means for supplying liquid to be sterilized to the one surface of said hollow body, means for applying cooling liquid to the other surface of said hollow body, and a source of ultra-violet rays to which the first mentioned surface is exposed.

8. In apparatus for sterilizing liquid, the combination of a rotatable funnel having a corrugated surface with corrugations in planes perpendicular to the axis of rotation, means for supplying liquid to the said surface in the form of a thin film, and a source of ultra-violet rays to which said surface is exposed.

9. In apparatus for sterilizing liquid, the combination of a rotatable funnel having a corrugated surface with corrugations in planes perpendicular to the axis of rotation, means for supplying liquid to the said surface in the form of a film, and a mercury vapor lamp to the radiations from which said surface is exposed.

10. In apparatus for sterilizing liquid, the combination of a rotatable funnel having a corrugated surface with corrugations in planes perpendicular to the axis of rotation, means for supplying liquid to the said surface in the form of a thin film, and a mercury vapor lamp having a quartz container located in proximity to said surface.

In testimony whereof we have hereunto subscribed our names this 15th day of February 1910.

VICTOR HENRI.
ANDRÉ HELBRONNER.
MAX von RECKLINGHAUSEN.

Witnesses:
JACK H. BAKER,
H. C. COXE.